Inventor
JOHN KENNETH BACHE

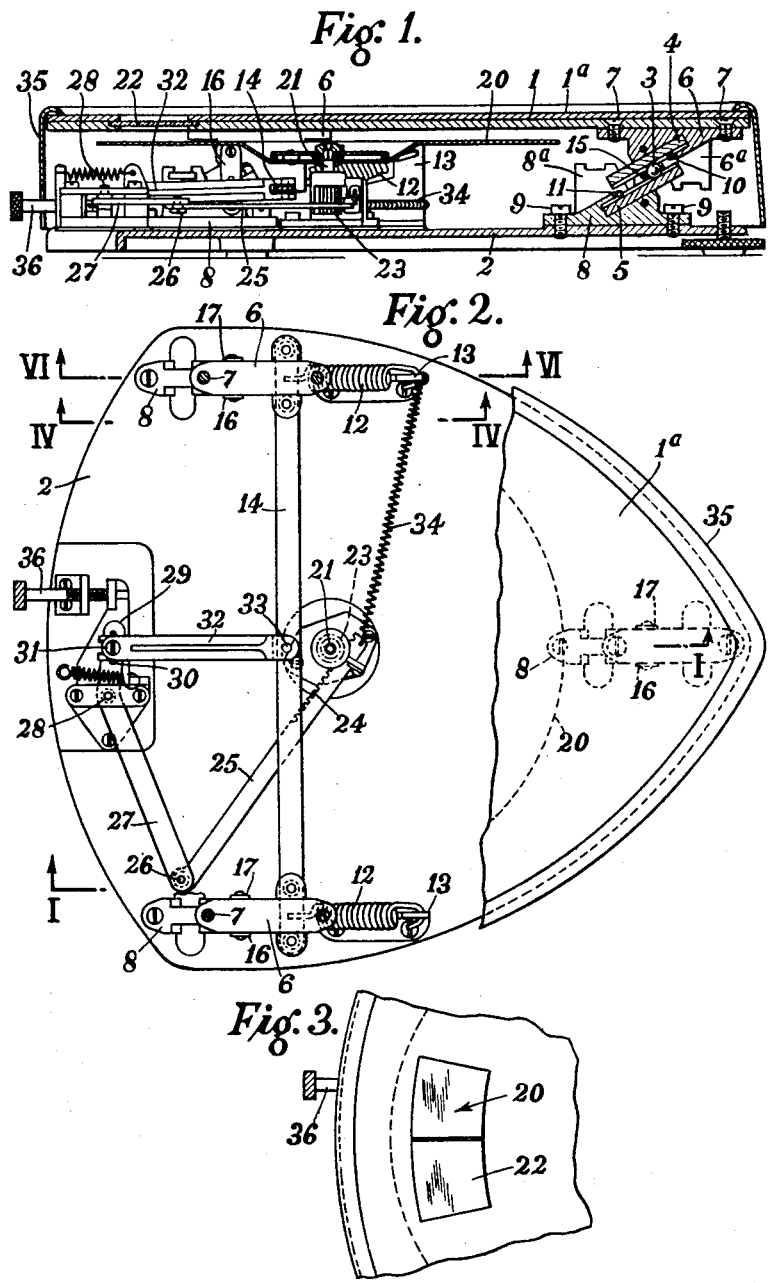

By Lawrence L. Colbert
Attorney

Patented Apr. 15, 1952

2,593,086

UNITED STATES PATENT OFFICE 2,593,086

WEIGHING MACHINE

John Kenneth Bache, West Bromwich, England, assignor to George Salter & Co. Limited, West Bromwich, England, a British company Application November 25, 1949, Serial No. 129,249
In Great Britain February 9, 1949

3 Claims. (Cl. 265—68)

This invention relates to weighing machines of that kind wherein a weighing platform is mounted upon a lower inclined supporting surface through the medium of a ball or anti-friction element disposed between the said lower supporting surface and an opposed upper inclined surface of the weighing platform, or of a part carried thereby, the weighing platform being movable downwards, and in its own plane, under a load relatively to the lower supporting surface against the action of a spring.

The object of the present invention is to provide means for maintaining the ball or anti-friction element always in a correct or suitable position in relation to the opposed inclined surfaces between which it is disposed, so that a true rolling contact between the anti-friction element and the said surfaces is always maintained during the movement of the platform.

According to the invention, in a weighing machine of the kind referred to, a retaining device is provided immediately in front of the ball or anti-friction element, the said retaining device consisting of a stop carried by the middle of a link or equivalent member pivoted at one end to the weighing platform, or to a part thereon, and at its other end to a relatively fixed support provided with, or carrying a part with the lower inclined supporting surface, so that the said stop, being carried by the centre of the link, moves through one half of the distance travelled through by the weighing platform, that is through a distance equal to that moved through by the centre of the ball, or by the anti-friction element. The stop may consist of a bar or pin carried between the centres of a pair of parallel links pivoted at their ends to upper and lower parts on the underside of the weighing platform and on a support or base respectively, the said upper and lower parts having opposed parallel inclined surfaces between which an anti-friction element, in the form of a ball, is disposed, so that the ball rests against the bar or pin which always moves through the same distance as the centre of the ball during the functioning of the weighing machine. The weighing platform may be returned to its normal raised position immediately it is relieved of the load by a suitably arranged spring or springs, whilst several pairs of opposed inclined surfaces, with a ball or anti-friction element between them, may be provided beneath the weighing platform, each ball having a stop or retaining device carried by the centres of links, so that it moves through the same distance as the centre of the ball. The movement of the platform under a load may be transmitted to an indicator or scale by any suitable means.

Figure 1 of the accompanying drawings represents a vertical section through a personal weighing machine of the kind referred to, on the line I—I, Figure 2, the weighing platform being supported by balls between opposed inclined surfaces, each ball having a retaining device constructed and arranged in accordance with this invention, and comprising a pin carried between a pair of links.

Figure 2 is a plan view of the machine, with the weighing platform broken away, to expose the weighing mechanism.

Figure 3 is a fragmental view of the weighing platform, showing the window therein for exposing the movable dial plate.

Figure 4:
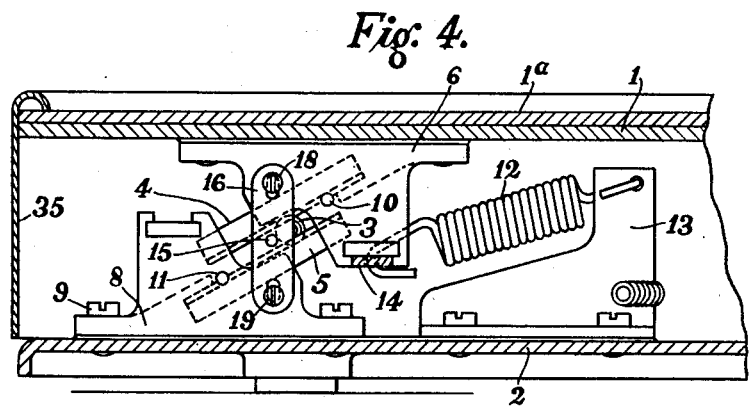
Figure 4 represents a section on the line IV—IV, Figure 2, upon a larger scale, with the weighing platform in its normal unloaded position.
Figure 5:
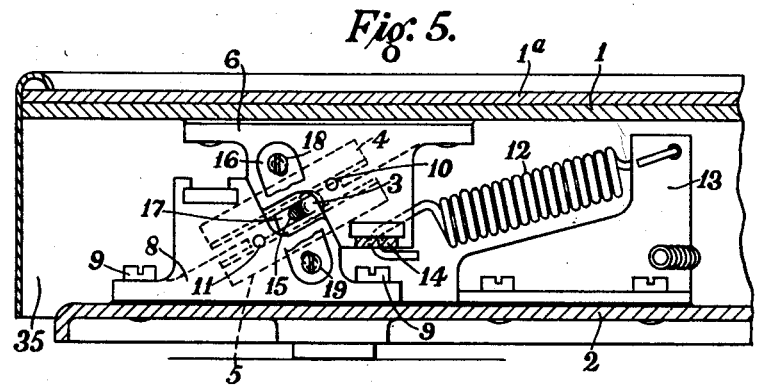
Figure 5 is a sectional view similar to that shown in Figure 4, but with the weighing platform in a loaded position, and with the outer link between the parts with the inclined surfaces broken away, the cross-pin which serves as a stop for the ball being in section.
Figure 6:
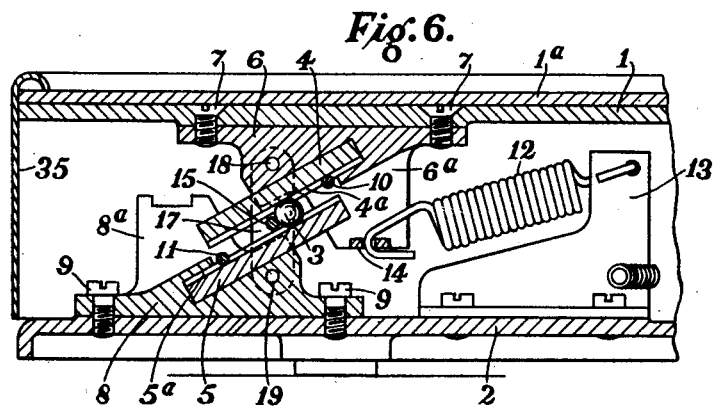
Figure 6 represents a section on the line VI—VI, Figure 2, upon a larger scale.

Referring to the drawings, the weighing machine illustrated comprises a weighing platform 1 supported above a base part 2 by means of three balls 3, each disposed between a separate pair of inclined surfaces formed by the opposed faces of a pair of parallel top and bottom races 4 and 5 respectively, grooved at 4ª and 5ª to receive the ball, as clearly shown in Figure 6. The three pairs of top and bottom races 4 and 5 are spaced apart, one beneath each side of the weighing platform, and one beneath the rear corner of the latter, the machine and platform being shaped in plan as shown in Figure 2, although it may be of any other desired form. Each top race 4 is fitted into a recess in a bracket 6 secured to the underside of the weighing platform 1 by screws 7, and depending from the said platform, as shown, whilst each bottom race 5 is fitted into a recess in a similar bracket 8 secured by screws 9 to the base 2 so as to project up from the latter. The races 4 and 5 may be retained in place within their recesses by cross-pins 10 and 11 respectively extending between side wings 6ª or 8ª on the brackets; or the races may be secured by other means. Normally the weighing platform 1 is maintained in a raised position by a pair of coiled tension springs 12 each anchored at one end to an upright 13 on the base and attached at its other end to a cross-bar 14 secured at its ends to the wings 6ᵃ of each of the two brackets 6 at the sides of the weighing platform. No spring is provided at the rear corner of the machine.

The arrangement is such that when the weighing platform is acted upon by a load it is moved downwards and in its own plane against the action of the springs 12, which are extended, the upper races 4 of the three sets moving with a rolling contact over the balls 3, which are themselves caused to roll down over the lower races 5. The movement of the weighing platform is proportional to the load, and it will be obvious that the distance moved through by the top race 4 and by the weighing platform 1, in relation to the base 2, will be equal to twice the distance moved through by the ball 3. In order to prevent the balls 3 from rolling inadvertently to the lower ends of the races 5, if, for example, the weighing platform 1 is raised relatively to the base, a stop device consisting of a bar or pin 15 is provided immediately in front of each ball 3. Each stop-bar or pin 15 is arranged to move through the same distance as the centre of the respective ball 3 during the downward and upward movement of the weighing platform, so that whatever is the position of the latter the bar or pin will always be immediately in front of the ball. To enable each stop-bar or pin 15 to move always through the same distance as the centre of the ball, it is attached to the centres of a pair of links 16, 17, disposed immediately opposite and parallel to one another. The links 16 and 17 of each pair are jointed at 18, at their upper ends, to the respective bracket 6 on the underside of the weighing platform, whilst they are jointed at 19, at their lower ends to the corresponding bracket 8 on the base of the machine, the joints 18 and 19 being formed by screws passing through slots in the links. The arrangement is such that the pairs of links 16 and 17 move angularly about their lower pivots 19 during the downward movement of the weighing platform, their upper pivots 18 moving through the same distance as that moved through by the weighing platform. Since the stop bar or pin 15 extending between the links of each pair is disposed at the centres of the said links, midway between the pivots 18 and 19, it will during this angular movement travel through half the distance moved through by the pivots 18, that is through a distance which is half that moved through by the weighing platform. It consequently moves through a distance which is equal to that moved through by the centre of the ball, so that it is thus always kept close up to the ball, without, however, interfering with the free rolling action of the latter. Each ball is consequently always maintained in the correct position and is effectively prevented from moving inadvertently to the lower end of the bottom race, this being essential for the efficient working of a weighing machine of this kind. Whilst the primary object of the three pairs of links is to carry the stop pins for the balls they serve at the same time to connect the weighing platform to the base through the respective brackets 6 and 8.

The movement of the weighing platform 1, under a load, may be transmitted to an indicator of any suitable form and by any desired means. In the weighing machine illustrated the indicator consists of a graduated dial plate 20 carried by a central spindle 21 (Figure 1) and adapted to be rotated about the axis of the spindle beneath a window 22 in the weighing platform. The spindle 21 carries a pinion 23 which meshes with teeth 24 on a rack-bar 25, the latter being jointed at its outer end at 26, as illustrated in Figure 2, to the longer arm 27 of the lever pivoted at 28 to a part on the base 2 of the machine. The shorter arm 29 of this lever is formed with a slot 30 engaged by a pin 31 at the one end of a link 32, the other end of which is jointed at 33 to the middle of the cross-bar 14 which is secured to the two brackets 6 at the sides of the weighing platform, and carried by the underside of the latter. The teeth of the rack-bar 25 are maintained in engagement with the pinion 23 by a spring 34. The whole of the mechanism is enclosed by a surrounding skirt or wall 35 carried by, and movable with, the weighing platform 1, which may carry an upper cover plate 1ᵃ. When a person stands on the weighing platform the latter is moved downwards, and in its own plane, against the action of the springs 12 proportionally to the load, the brackets 6 and the cross-bar 14 moving with the platform. The movement of the cross-bar is transmitted through the link 32 to the arm 29 of the lever, the movement of the latter being transmitted to the rack-bar 25 and thence to the dial plate 20. A screw 36 may be provided for the correct initial setting of the mechanism.

Any number of pairs of inclined surfaces may be provided, with balls or anti-friction elements between them, according to requirements. Rollers may be used instead of balls, if desired.

I claim:

1. A weighing machine comprising: weight-indicating means, a weighing platform, a part on the under side of said platform having a downwardly-presented inclined surface; a base part, and a spring; the platform being movable under a load against the action of the spring, downwards and in its own plane, relatively to the said base part; a part on the base part having an upwardly-presented inclined surface opposed to and disposed below the first named inclined surface; the two inclined surfaces being disposed parallel to one another throughout their length; an anti-friction element disposed between the said two inclined surfaces; a link pivoted at one end to a part on the weighing platform and at the other end to a part on the base part; and a stop carried by the middle of the said link and disposed immediately in front of the anti-friction element to retain the latter in a correct position in relation to the aforesaid two inclined surfaces; the said stop moving through one half of the distance traveled through by the weighing platform, that is through a distance equal to that moved through by the anti-friction element.

2. A weighing machine comprising: weight indicating means, and a weighing platform; a part on the under side of said platform having a downwardly-presented inclined surface; a base part, and a spring; the platform being movable under a load, against the action of the spring, downwards, and in its own plane, relatively to the said base part; a part on the base part with an upwardly-presented inclined surface opposed to and disposed below the first-named inclined surface, the two inclined surfaces being grooved throughout their length, with the grooves parallel to one another; a ball disposed between the said two inclined surfaces in the grooves; a link pivoted at one end to a part on the weighing platform and at the other end to a part on the base part; and a stop carried by the middle of the said link disposed immediately in front of the ball to retain the latter in a correct position in relation to the aforesaid two inclined surfaces, the said stop moving through one half of the distance traveled through by the weighing platform, that is through a distance equal to that moved by the ball.

3. A weighing machine comprising: weight indicating means and a weighing platform; a part on the under side of the said platform having a downwardly-presented inclined surface; a base part, and a spring against the action of which the platform is movable under a load, downwards and in its own plane relatively to the said base part, a part on the base part with an upwardly-presented inclined surface opposed to and disposed below the first-named inclined surface, the two inclined surfaces being longitudinally grooved, with the bottoms of the grooves parallel to one another; a ball disposed within the grooves between the said two inclined surfaces; a pair of parallel links each pivoted at one end to a part on the weighing platform and at the other end to a part on the said base part; and a stop carried between the centres of the said links and disposed immediately in front of the ball to retain the latter in a correct position in relation to the aforesaid two inclined surfaces.

JOHN KENNETH BACHE.

REFERENCES CITED

The following references are of record in the file of this patent:

UNITED STATES PATENTS

| Number | Name | Date |
|---|---|---|
| 1,976,632 | Piquerez | Oct. 9, 1934 |
| 1,995,578 | Piquerez | Mar. 26, 1935 |
| 2,395,784 | Honegger | Feb. 26, 1946 |

FOREIGN PATENTS

| Number | Country | Date |
|---|---|---|
| 138,404 | Germany | Feb. 7, 1903 |
| 564,040 | Great Britain | Sept. 11, 1944 |
| 634,740 | Germany | Sept. 2, 1936 |